PATENTED MAY 25 1971  3,581,202
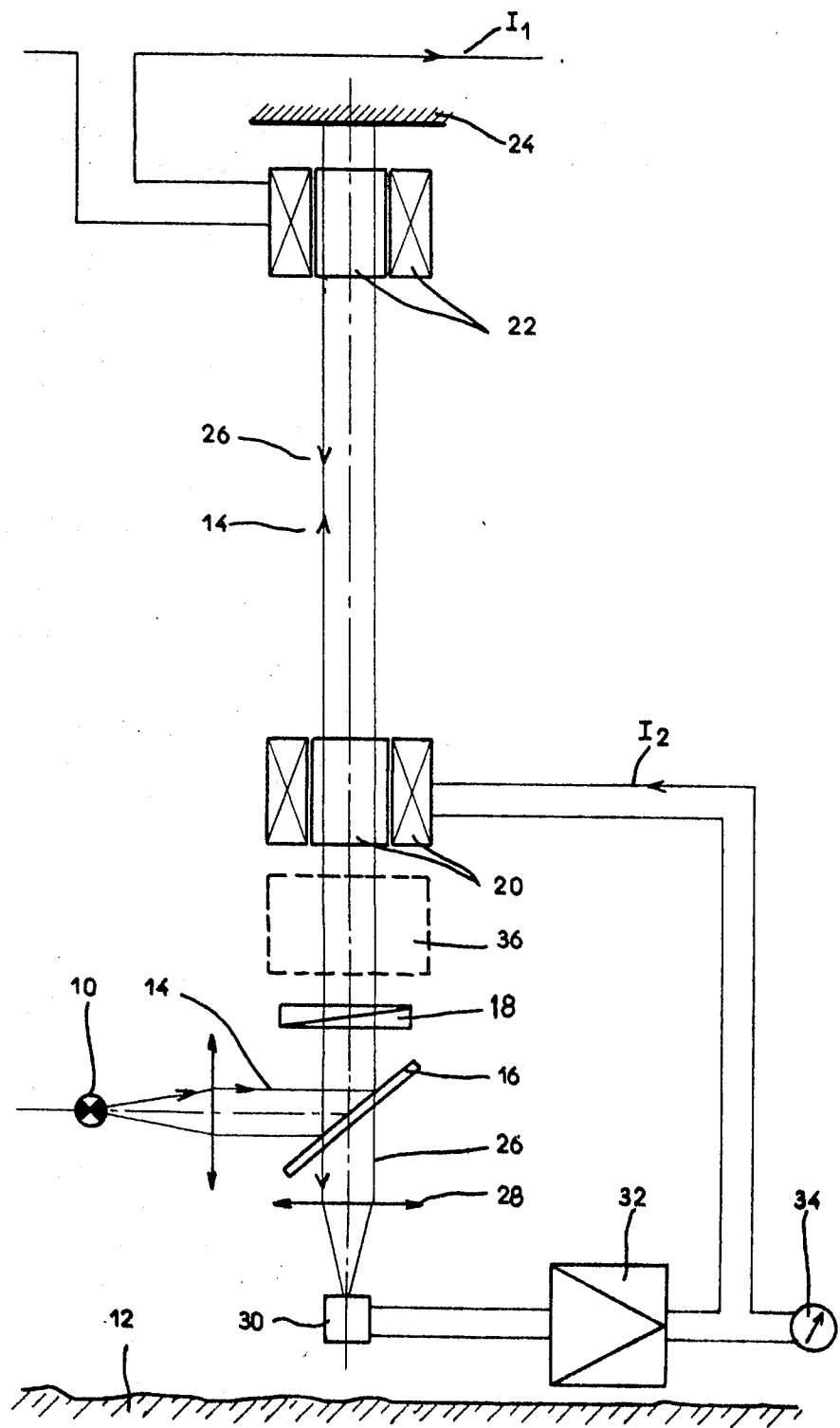

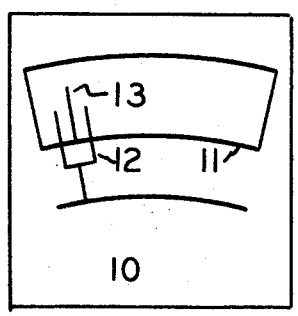
FIG.1
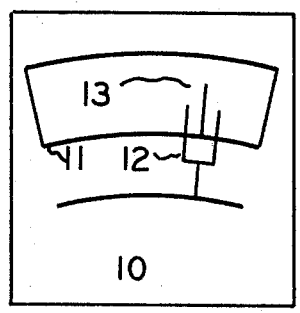
FIG.2
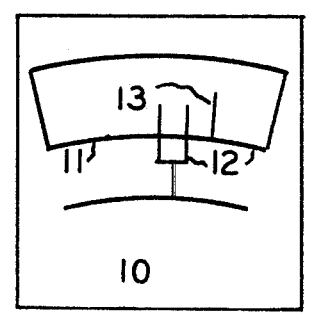
FIG.3
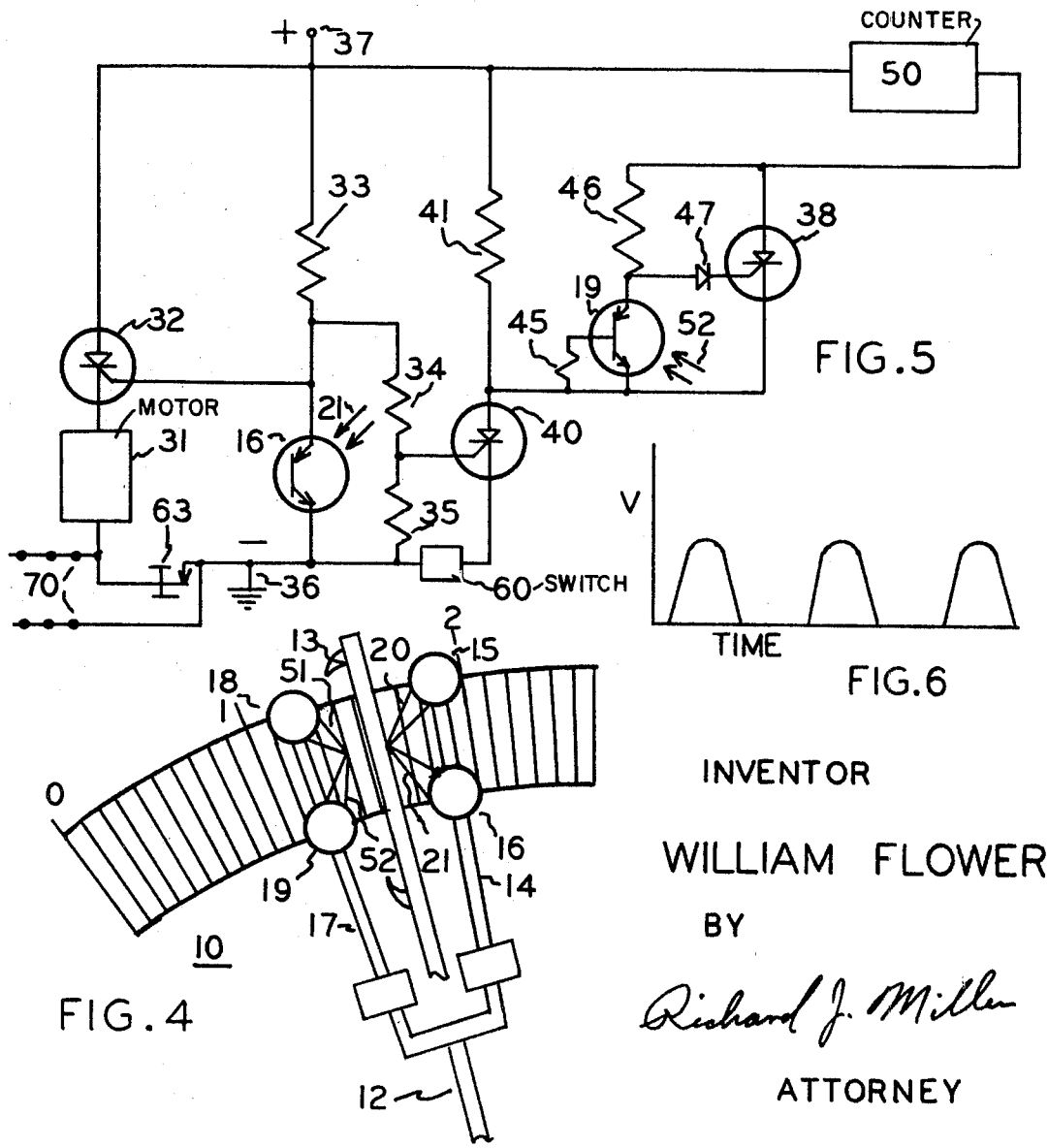
INVENTOR
WILLIAM FLOWER
BY
Richard J. Miller
ATTORNEY

ANALOG METER HAVING MEANS TO PROVIDE A DIGITAL READING OF THE POINTER POSITION

The invention described herein may be manufactured and used by or for the Government of the United States of America for governmental purposes without the payment of any royalties thereon or therefor.

Generally, methods have been disclosed in the past and instruments developed which are coupled therewith to provide reading indicating meters which have the ability to note specific points and for transmitting such reading points on a meter to a remote area. However, these devices have not been designed to substantially improve the readability and the accuracy of the meter.

Generally, the reasons for this are that indicating meters usually have nonlinearities and large hysteresis losses; and a pointed-type instrument is not too often used for differential readings because it is impractical to be read as such although magnifying glasses are provided. Automatic no-balance techniques are friction, mass, and torque dependent and as a result have a wide variation in readings. Scanning techniques are resolution limited and not accurately time controllable. With the arrangement of the automatic equipment available for readouts, it is easy to bypass the fact that many secondary standards are indicating-type meters. The scale nonlinearities of these meters are fixed and have a minimum number of failure modes as compared to devices requiring amplification of small motions in order to assure mechanical linearities. Restated there is an over emphasis in doing simple mechanics with sophisticated electronics.

Therefore, it is an object of this invention to provide an improved digitalized indicating meter. means It is a further object of this invention to provide a pointer indicating instrument, coupled with a light operated electronic switch which closes when a sufficient amount of light is encountered, a light-operated switch which begins producing electrical impulses from light traversing over variations of the meter scale markings or reflectivity on initiation of the switch in the light-operated electronic switch, means including a motor for positioning the light probes beyond the pointer in a ready read position, mean s including a device to return the pulse producing light probe below meter zero, a pulse operated mechanical counter which counts the scale markings below the needle with respect to zero and a pulse operated integrating device for assembling a voltage analogue of the indicating meter function.

It is yet another object of this invention to provide an improved meter for digitalizing the output thereof to produce an analogue reading for performing certain electronic functions. This results in many advantages, for example, is relatively inexpensive, additionally, the order of accuracy of the meter approaches a standard or reproducible device because the mechanical magnification makes desirable use of better materials. Normal reading accuracy is between two and one-tenth part in a hundred, and a repeatability of better than one part in 10,000 can be obtained. This restated in terms of resolution makes it dependent only on the meter repeatability.

Since the total portion of the scale to be read is fixed at the instant that the needle position indicating switch is closed, any other meter, similarly initiated, provides good time correlation. The correlation will be in the difference between the energized read button closure instant, and the individual indicating pulse times, approximately 0.02 seconds.

The disclosed device has an improved rate of reading since digital voltmeters require seconds to balance. Further a digital FIGS. with mechanical tracking requires a minimum of three-tenths of a second. A further limitation on the digital voltmeter with electronic balancing is that impinging must complete each higher order of comparison and the lowest order of comparison can only be completed after all others. The accuracy of the digitalized indicating meter, is more reliable than the accuracy of a digital voltmeter which depends upon the individual accuracy of a string of components even though these are a reference to a single voltage.

When a digital voltmeter begins to roll because of noise on top of its reading potential, there is sometimes little dependence upon any order of magnitude of the numerical display. On the other hand, the disclosed invention has maximum error equal to the noise or vibration and generally considerably less because natural meter damping is encountered. Further, conversion of well developed indicating meters into direct readouts, analogue voltages, and printouts becomes practical notwithstanding the fact that they are inherently nonlinear. Other objects, advantages and novel features of the invention will become apparent from the following detailed description of the invention when considered in conjunction with the accompanying drawings wherein:

FIG. 1 shows a meter at rest;
FIG. 2 shows a meter in use;
FIG. 3 shows a meter reading;
FIG. 4 shows a meter in detail;
FIG. 5 shows a circuit adapted to read the meter; and
FIG. 6 is a scale showing the voltage generated by the circuit of FIG. 5.

FIGS. 1, 2 and 3 show three steps in the operation of the digital indicating meter, wherein is shown a meter, generally designated as 10, having a meter face and scale conotated as 11. Mounted outside the face of the meter, in operable position, is the digitalizing portion 12 shown in more detail later on. Before the system is turned on needle 13 is in the rest positions as is the digitalizing meter arm 12. Whatever function needle 13 is to read, it is coupled to the meter which is turned on, and will cause the needle to go to some predetermined point shown in FIG. 2 on the scale. As the needle moves upwardly, or to the right as shown, the digitalizing arm, because of its unique construction, will follow the needle in the upward direction. At some read point the digitalizing arm will fall back toward zero, as shown in FIG. 3, counting the individual scale markings as it goes, thus producing a pulsed output from its electronic circuitry hereinafter described, resulting in a measure of the distance the needle has gone up the scale to the read position.

In the embodiment shown, the meter needle operates at its normal speed and the digitalizing arm operates at a read point in time in a downwardly direction at a speed not to exceed that which will insure an accurate count since in the embodiment disclosed, it is desirable to read a specific point on the meter in conjunction with, in point of time, with reading specific points on other meters. This function is performed repetitively The meter and digitalizing arm are shown in more detail in FIG. 4 and an example of electronic components which may be used are shown in detail in FIG. 5. Needle 13 is shown in the second position, that is the position of FIG. 2, the digitalizing arm 12 moving up with the needle of meter 10. On a first arm 14 of the digitalizing arm 12 there is mounted a first light source 15 and a first photodiode 16. A second arm 17 of the digitalizing arm has mounted thereon a second light source 18 and a second phototransistor 19. Light source 15 is shown directing a light beam 20 onto the needle 13. A reflected beam 21 is shown directed towards diode 16.

FIG. 5 shows the circuitry for accomplishing the desired end of digitalizing the meter readings shown in the previous FIGS. A drive up motor 31 is shown coupled in series with a silicon controlled rectifier 32. The reflected light beam 21 is shown impinging upon photodiode 16 and as long as it is conducting the potential across resistance 33 is such as to keep the silicon-controlled rectifier in a conducting mode allowing current to flow through the drive up motor 31. A constant speed motor might well be used wherein the needle movement has a substantially constant speed. For example, a filling operation being remotely sensed by a meter coupled thereto wherein the flow and filling rates are constant and the amount of fill is determined where the meter is merely registering the final point at which fill ceases. Hence, needle 13 is followed by the digitalizing arm 12 as the needle travels in the upward direction, or to the right. Resistors 34 and 35 provide a voltage dividing network between ground or negative terminal 36 and positive power source 37. While diode 16 is conducting the bias on the silicon controlled rectifier 40 is such as to prevent it from conducting, hence, there is a high potential across the resistance 41 which biases phototransistor 19, such that it is normally on. Under these conditions resistors 45 and 46, which coupled through diode 47, serve to control the silicon controlled rectifier 38 which in turn controls the current through counter 50. Phototransistor 19 is normally on with a high reflectivity from light projected by light source 18, that is light 51 which would be reflected from the meter face as light 52. When there is low reflectivity the phototransistor 19 is in the off position. A bottom of the scale switch 60 is provided to stop the operation of the counter when the digitalizing arm reaches zero. Switch 60 can be electronic and placed at other points on the meter scale 10, such as 1, 2, or 3, etc., so as to significantly decrease the repetition time.

As set forth above when the meter is reading a function of some sort, such as, increasing pressure in a system, the needle will travel in an up-scale direction. The digitalizing arm through light source 15, reflected light 20, 21 and diode 16 will actuate the drive motor 31 to cause the arm to follow the needle in an upward direction, at some point which is normally not known, the meter will read a variation such as the opening of a pressure switch or a change in voltage due to a device conducting and the needle will stop its upward motion. At that point the read-track switch 63 will be activated, causing the photodiode 16 to cease conducting and the bias applied to silicon controlled rectifier 32 will change to turn off the drive up motor 31. At that time the arm 12 starts to go in the leftward or down scale direction. As is passes the dark portions of the meter scale the phototransistor 19 shuts off, this causes the silicon controlled rectifier 38 to actuate and a pulse is generated and applied to by the counter 50. As the arm continues down scale it will encounter a white portion of the meter face and phototransistor 19 will conduct, at which point the silicon-controlled rectifier 38 is actuated again in the opposite direction to cause the pulser to react. Thus, an interrupted wave is generated by the phototransistor 19 as it reads alternately dark and light portions on the meter face and there is generated and applied to the counter 50 a wave which has a form somewhat as shown in FIG. 6. The meter scale can be generated photographically for individual meters which are often nonlinear.

Thus, there is provided a means for reading an analogue device such as the needle of a meter movement and converting this to a digitalized form which can be transmitted electrically to a remote sensed spot for whatever purpose it is desired.

One such use is the reading of a group of meters remotely spaced from each other and hooked into the read-track switch 63. Symbolically, these are shown as a series of contacts 70. With this configuration it is possible for the operator to actuate a plurality of switches and obtain readings instantaneously (within 10ths of seconds) of a plurality of meters spaced from each other. An additional advantage is that the readings may be taken many times and the same point is read each instance. It should be noted that the system in no way loads the needle since the sensing device is the reflected light which places no drag upon the needle. It will also be noted that high-output, normally nonlinear indicators, can be read without depending on high noise, linear devices or expensive bit-coded counters.

Obviously many modifications and variations of the present invention are possible in the light of the above teachings. It is therefore to be understood that within the scope of the appended claims the invention may be practiced otherwise than as specifically described.

I claim:

1. Digital indicating meter, comprising:
   a. a meter movement including a scale and needle;
   b. an arm mounted adjacent said meter movement for motion substantially equal to said needle, said arm having first and second portions;
   c. a first light source and first sensitive device mounted on said first portion for projecting a first light beam to be reflected from said needle to said first light sensitive device;
   d. a second light source and second light sensitive device mounted on said second portion for projecting a second light beam to be reflected from said scale to said second light sensitive device;
   e. a drive motor coupled to said arm for causing said arm to move upon receipt of a drive signal;
   f. first circuitry coupled to said first light sensitive device to actuate said drive motor causing said arm to move with said needle upon receipt of light from said light source reflected from said needle to said first light sensitive device;
   g. second circuitry coupled to said second light sensitive device for producing signals when said second light sensitive device receives light reflected from said meter scale, said reflected light intensity varying when reflected from light or dark portions of said meter scale; and
   h. means, responsive to said signal to record the movement of said signal variations.

2. The digital indicating meter of claim 1 wherein said first and second portions of said arm are substantially U-shaped and mounted on said arm with the open end of said "U" capable of encompassing said needle.

3. The digital indicating meter of claim 2 wherein said arm is pivotally mounted so that its movement is normal to an axis extending through the axis of rotation of said meter movement.

4. The digital indicating meter of claim 1 wherein said first circuitry includes means for coupling said digital indicating meter to a plurality of remotely placed indicating meters for synchronistically actuating said remotely placed digital meters.

5. The digital indicating meter of claim 1 wherein said first circuitry includes a means for stopping the down-scale motion of said arm when the zero portion of said scale is reached.

6. The digital indicating meter of claim 1 wherein said first and second circuitry includes means for stopping the up-scale movement of said arm when the top of said scale is reached.

7. The digital indicating meter of claim 1 wherein said first and second light sensitive devices are photocells.

8. The digital indicating meter of claim 1 wherein said first and second light sensitive devices are photodiodes.